United States Patent
Brodersen

[11] Patent Number: 5,938,340
[45] Date of Patent: Aug. 17, 1999

[54] SLIDE PUCK ADJUSTABLE BEARING SYSTEM

[76] Inventor: Cole T. Brodersen, 2702 E. Hayes, Davenport, Iowa 52803

[21] Appl. No.: 08/871,735

[22] Filed: Jun. 9, 1997

[51] Int. Cl.[6] .................................................... F16C 29/02
[52] U.S. Cl. ................................................ 384/40; 384/42
[58] Field of Search .................................. 384/10, 20, 22, 384/23, 26, 34, 37, 38, 39, 40, 41, 42

[56] References Cited

U.S. PATENT DOCUMENTS

| | | | |
|---|---|---|---|
| 2,342,946 | 2/1944 | Le Tourneau | 384/40 |
| 3,649,090 | 3/1972 | Dutot | 384/23 |
| 4,114,945 | 9/1978 | Lutz | 384/37 X |
| 4,516,811 | 5/1985 | Akiyama et al. | 384/34 |
| 4,773,769 | 9/1988 | Church | 384/42 |
| 4,941,758 | 7/1990 | Osawa | 384/40 |
| 5,681,116 | 10/1997 | Lin | 384/42 |

FOREIGN PATENT DOCUMENTS

| | | |
|---|---|---|
| 436631 | 10/1935 | United Kingdom . |
| 479559 | 2/1938 | United Kingdom . |
| 816050 | 7/1959 | United Kingdom ..................... 384/40 |
| 819738 | 9/1959 | United Kingdom . |
| 931288 | 7/1963 | United Kingdom . |
| 1214896 | 12/1970 | United Kingdom . |
| WO 82/0321 | 9/1982 | WIPO . |

*Primary Examiner*—Thomas R. Hannon
*Attorney, Agent, or Firm*—Niro, Scavone, Haller & Niro

[57] ABSTRACT

A slide puck bearing system is provided comprising members which are intended to slide, move or rotate along or about one another. A slide puck bearing composed of a material such as acetal having a low coefficient of friction is adjustably fixed to a first member and has outer contours mating snugly with the surface contours of a second member. A set screw resides in the slide puck bearing to adjust the positioning of the bearing on the first member to adjust the tension against the second member. The slide puck can be adjusted or replaced throughout the life of the device. The system can be utilized with any devices wherein a member slides, rotates or moves relative to another member.

7 Claims, 3 Drawing Sheets

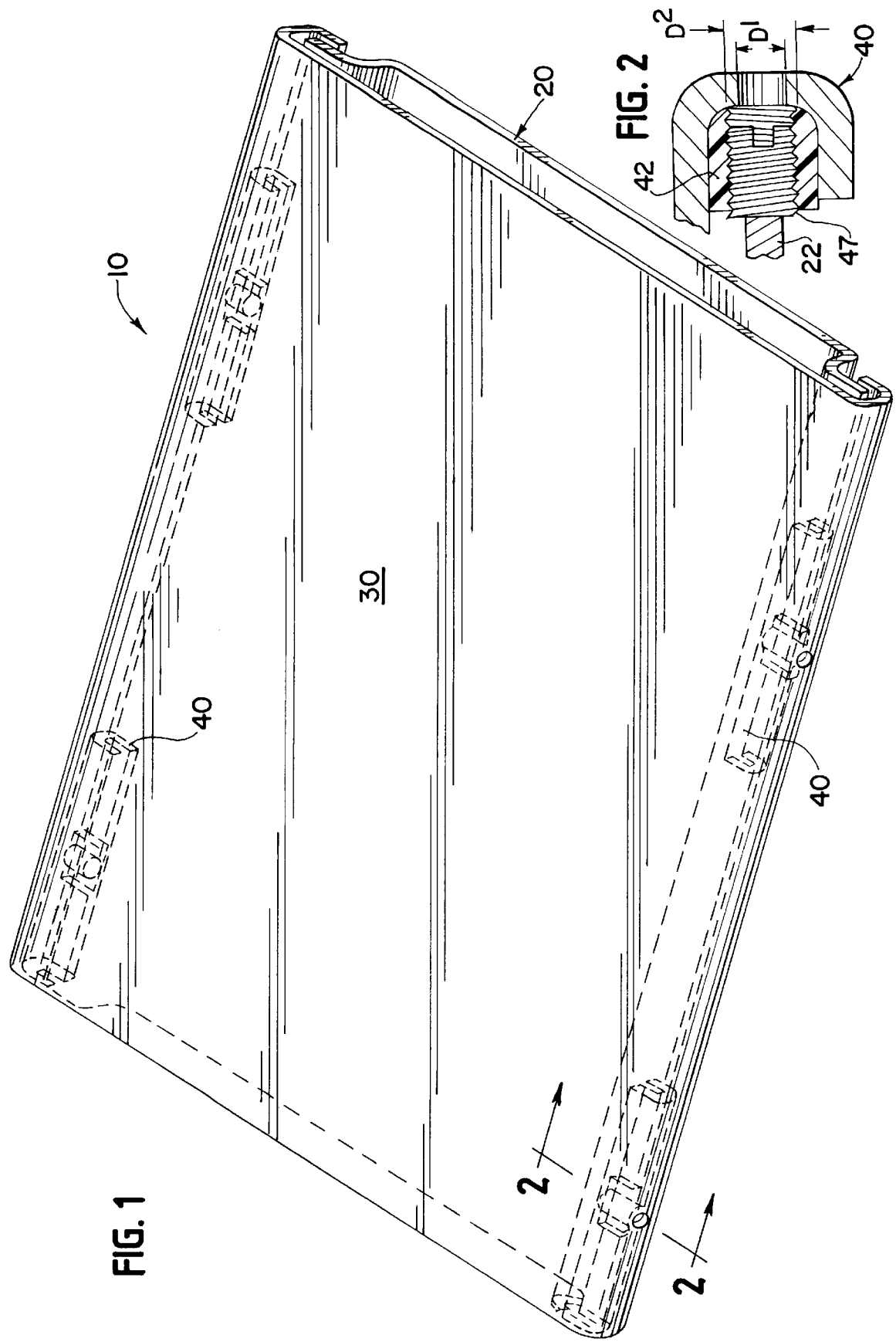

SLIDE PUCK ADJUSTABLE BEARING SYSTEM

BACKGROUND OF THE INVENTION

The present invention relates to slide puck bearing elements for slidingly engaging cooperating members and, more specifically, to a slid puck bearing system for a sliding seat assembly.

Virtually countless apparatuses utilize sliding members. Generally, when two members slide or move relative to one another, the two members must be manufactured or machined to very strict tolerances. Such requirements can be very expensive and difficult to achieve. Such devices often are complicated by the fact that they are used in stressful environments, which can tend to deteriorate the engagement of the members.

Therefore, a need exists for a device which allows members, in whatever shape, form or application, to slidably or movably engage one another without the requirement for strict machining tolerances, and which do not deteriorate under stressful environmental conditions and which, further, are adjustable to account for any wear over the life of the device.

SUMMARY OF THE INVENTION

The present invention comprises bearings made of acetal, acetone, nylon, oil-impregnated bronze, or other suitable materials, having the proper frictional and structural characteristics, adaptable to interface between slidable members. Preferably, the slide pucks of the present invention are formed to firmly engage one of the members via an internal set screw and to slidingly abut a second member. The second member has an aperture or apertures through which the set screws can be adjusted to modify the tension of the slide puck bearing between the first and second members. When positioned at the desired location between the members, having the desired frictional and mating characteristics, the bearing is said to be in its effective bearing location. The slide pucks can be virtually any shape, and, thus, accommodate the interface between virtually any sliding members. Further, despite the name, the slide pucks can be used to facilitate rotational or any other movement of one member relative to another.

Thus, it is an object of the present invention to provide a slide puck bearing device which interfaces between two members which move relative to one another and facilitates such movement.

A further object of the present invention is to provide an adjustable bearing device which can be adjustably secured to one member which slidably engages another member to vary the relationship between the members.

A still further object of the present invention is to provide an inexpensive bearing system which interfaces between multiple members to facilitate the members moving relative to one another and which can be adjusted to increase or decrease the friction between moveable members.

An even further object of the present invention is to provide moldable slide puck bearings which can be shaped to interface between virtually any two members which move relative to or along one another to relax or tighten the tolerances otherwise required between the moving members.

Another object of the present invention is to provide a slide puck bearing system comprising a plurality of low-friction slide pucks which can be adjusted and replaced over the life of two or more members which move relative to one another.

DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 1 is a perspective view of one embodiment of the slide puck bearing assembly of the present invention.

FIG. 2 is a cross-sectional view of the slide puck bearing interfacing between two sliding members taken along the line 2—2 in FIG. 1.

DETAILED DESCRIPTION OF THE PREFERRED EMBODIMENT

Figure 3:
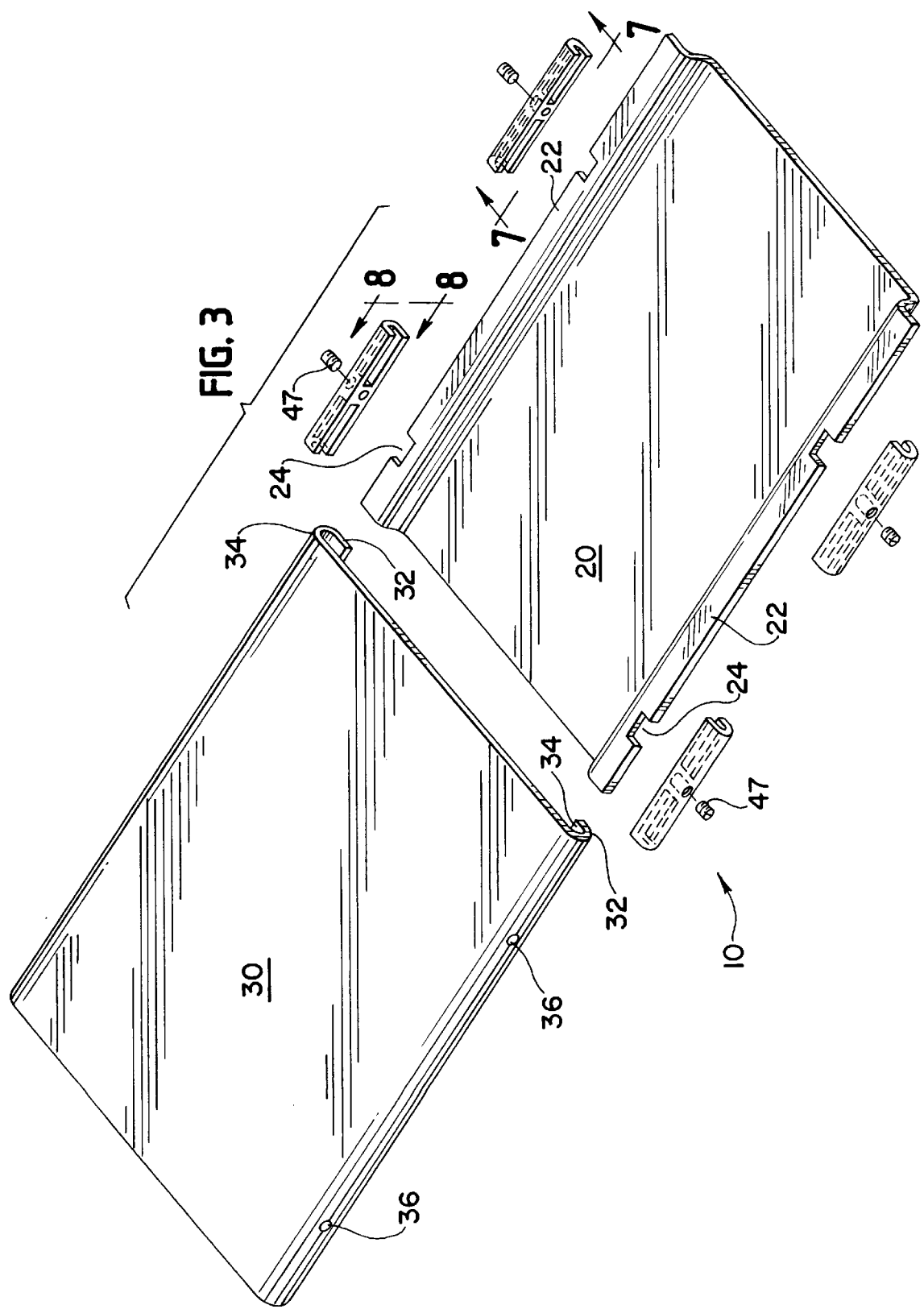
FIG. 3 is a perspective exploded view of one embodiment of a slide puck bearing system of the present invention.
Figure 4:
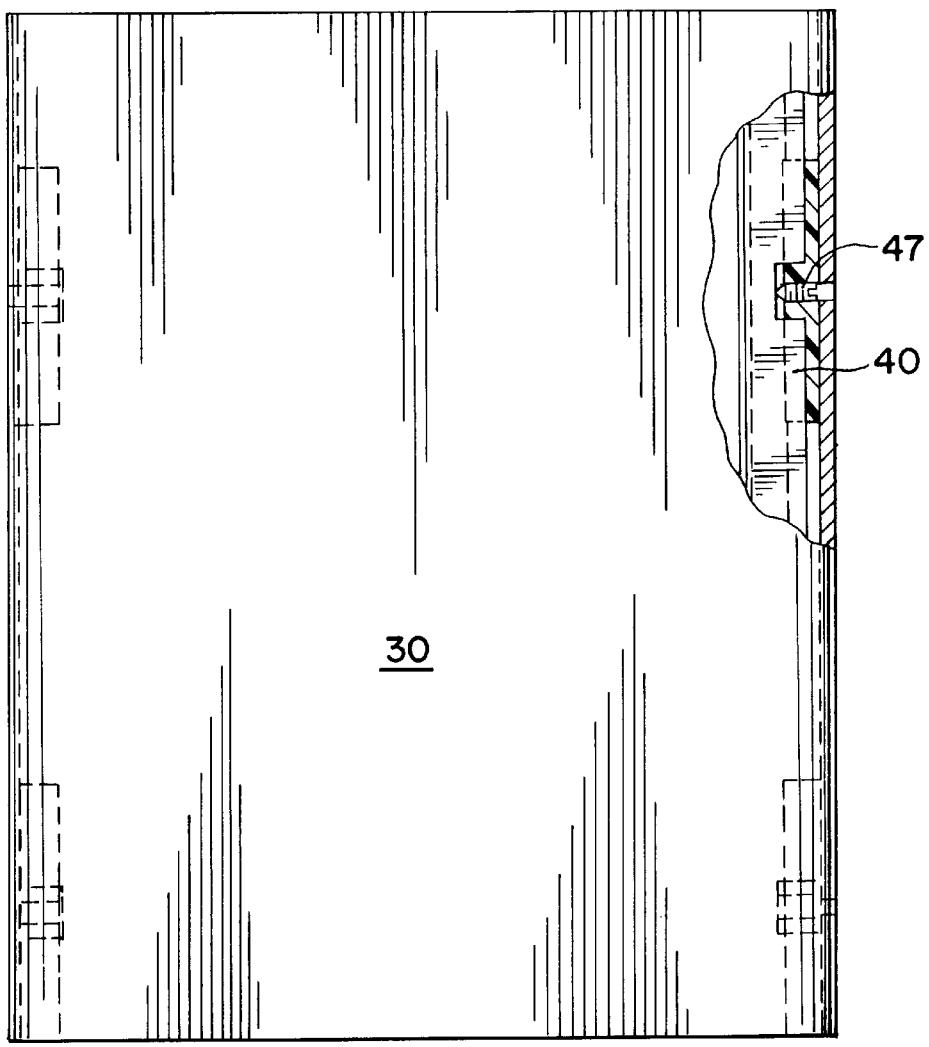
FIG. 4 is a top, partial cutaway view of one embodiment of the slide puck bearing system of the present invention.
Figure 5:
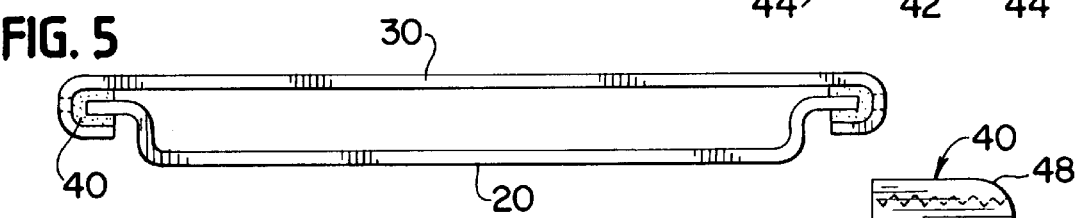
FIG. 5 is a front view of one embodiment of the slide puck bearing system showing two sliding members.

The preferred embodiment of the present invention, designated generally 10 in FIG. 1, comprises two members 20, 30 and a plurality of slide puck bearings 40. Each slide puck 40 is specifically adapted to be secured to one member 20 and engage the other member 30. As seen in FIG. 3, member 20 includes flange surfaces 22 which receive slide pucks 40. Flanges 22 include notches 24 to receive a center element 42 of slide puck 40 to thereby further secure slide puck 40 from sliding along flange 22.

Figure 7:
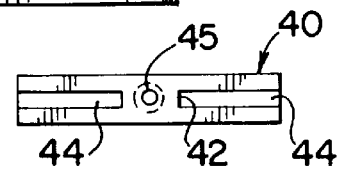
FIG. 7 is a front view of a slide puck bearing of the slide device of FIG. 1.
Figure 8:
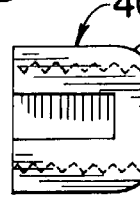
FIG. 8 is a side view of a slide puck bearing of the slide device of FIGS. 1 and 2.
Figure 6:
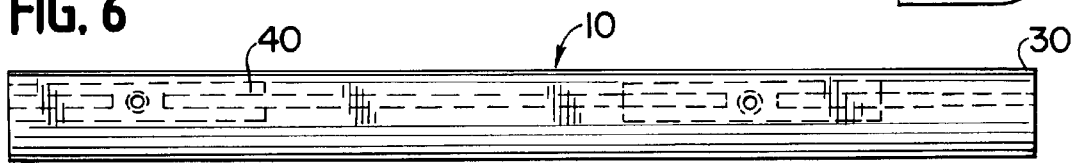
FIG. 6 is a side view of the slide device of FIG. 4.

As best seen in FIGS. 7 and 8, slide puck 40, in this preferred embodiment, is generally U-shaped in cross-section, forming two internal longitudinal channels 44 extending outward from a center element 42. Element 42 resides in a respective notch 24 of flange 22, thereby restricting slide puck 40 from longitudinal movement along flange 22. Channels 42 extend outward from element 42 and mate with flange 22. A threaded aperture 45 extends through solid portion 42 of slide puck 40. Aperture 45 houses flat-head bolt 47. Bolt 47 abuts flange 22 to adjust the positioning of slide puck 40 relative to member 20, as best seen in FIG. 2.

Member 30 is slidable along flanges 22. Member 30 has C-shaped portions 32 along either side thereof to engage the outer surfaces 48 of slide pucks 40. Slide puck 40 is molded to mirror and mate snugly with the inside surface 34 of C-shaped portions 32 of member 30. Slide pucks 40 thus secure member 30 to member 20 in a very stable relationship and have proper frictional characteristics to allow member 30 to move longitudinally relative to member 20 but also eliminate wobbling or play between the members.

To further prevent unintended movement between members 20 and 30, slide pucks 40 are each adjustable. In C-shaped portions 32 reside apertures 36. Apertures 36 are aligned with apertures 45 of each slide puck. To adjust the frictional characteristics and fit of slide pucks 40 between members 20 and 30, member 30 is positioned where apertures 36 and 45 are aligned. At that position, bolt 47 can be turned until the desired pressure is reached between slide puck 40 and interior surface 34 of C-shaped portion 32 to place the bearing into its effective bearing location. By this method, slide pucks 40 can be adjusted and replaced over the life of members 20, 30 to account for deterioration of slide pucks 30, 40 or a change in desired dynamics between members 20, 30.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

What is claimed is:

1. An adjustable bearing system comprising:
    a first structure;
    a second structure;
    a bearing adjustably disposed between said first and second structures for facilitating movement of one structure relative to the other structure; the bearing having a channel for mating with the first structure, a stop surface for abutting the first member preventing the bearing from sliding along the first member, and an aperture for receiving an adjustment member for adjusting the bearing to achieve an effective bearing location.

2. The adjustable bearing system of claim 1 wherein the second structure has an access aperture allowing access to the adjustment member.

3. The adjustable bearing system of claim 1 wherein the first structure includes a flange along which the second structure is intended to move, and to which the bearing is adjustably fixed.

4. The adjustable bearing system of claim 1 wherein the bearing has an outer surface which matingly engages the second structure surface in an effective bearing location facilitating the second structure moving relative to the first structure.

5. A system for facilitating a first member moving relative to another member comprising:
    a first member having a flange;
    a second member moveable about the flange and having a surface to cooperate with the flange of the first member;
    at least one bearing fixedly engageable to the flange and having an outer surface substantially conforming to said surface of the second member and an adjustment member threadedly residing in an aperture to adjust the positioning of the bearing relative to the flange;
    wherein the bearing mates with the first and second members to allow the first and second members to move relative to one another and to reduce unintended movement between said first and second members and wherein the effective location of the bearing between the members can be adjusted by adjusting the adjustment member.

6. A bearing for facilitating movement of a first member relative to a second member, said first member having a flange, and said second member having a surface cooperating with said flange to allow movement of said second member relative to said first member substantially along said flange, said bearing comprising:
    a channel mating with the flange of said first member and being longitudinally fixed and latitudinally adjustable relative to said flange;
    a threaded aperture;
    an adjustment member adjustably located within said aperture allowing latitudinal adjustment of said bearing relative to said flange;
    an outer surface engaging said surface of said second member;
    such that the bearing facilitates movement of the first member relative to the second member and reduces unintended movement between first and second members.

7. An adjustable bearing assembly comprising:
    a first member having a flange, the flange including an outwardly facing notch;
    a second member moveable relative to the flange and having a surface to cooperate with the flange of the first member;
    at least one bearing assembled to the flange and having an outer surface substantially conforming to said surface of the second member, said bearing having longitudinal channels separated by a center element, said center element being configured to cooperate with the notch in the flange, and an adjustment member threadedly disposed in the center element to adjust the position of the bearing relative to the flange;
    said second member having an access aperture allowing access to the adjustment member;
    wherein the bearing mates with the first and second members to facilitate movement of the first and second members relative to one another and to reduce unintended displacement between said first and second members and wherein the effective location of the bearing between the members can be adjusted by adjusting the adjustment member.

\* \* \* \* \*

UNITED STATES PATENT AND TRADEMARK OFFICE
CERTIFICATE OF CORRECTION

PATENT NO. : 5,938,340
DATED : August 17, 1999
INVENTOR(S) : Cole T. Brodersen

It is certified that error appears in the above-identified patent and that said Letters Patent is hereby corrected as shown below:

On the title page:

Item [73], Title page, insert -- Assignee:
Sears Manufacturing Company, Davenport, Iowa --

Signed and Sealed this

Twenty-ninth Day of August, 2000

Attest:

Q. TODD DICKINSON

Attesting Officer    Director of Patents and Trademarks